Aug. 25, 1925. 1,551,264
J. F. PALMER
METHOD OF MAKING INNER TUBES FOR PNEUMATIC TIRES
Filed July 21, 1920 4 Sheets-Sheet 1
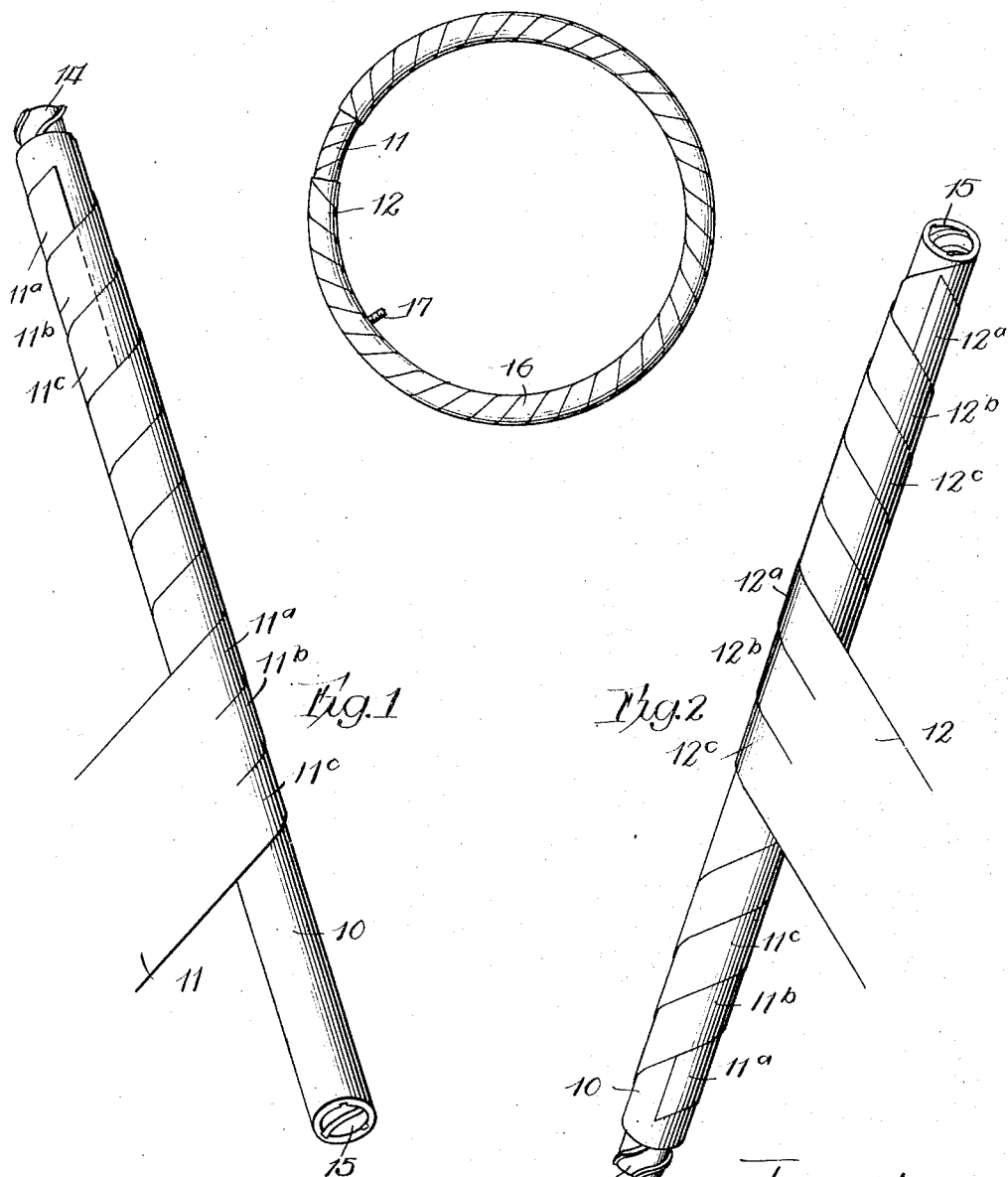

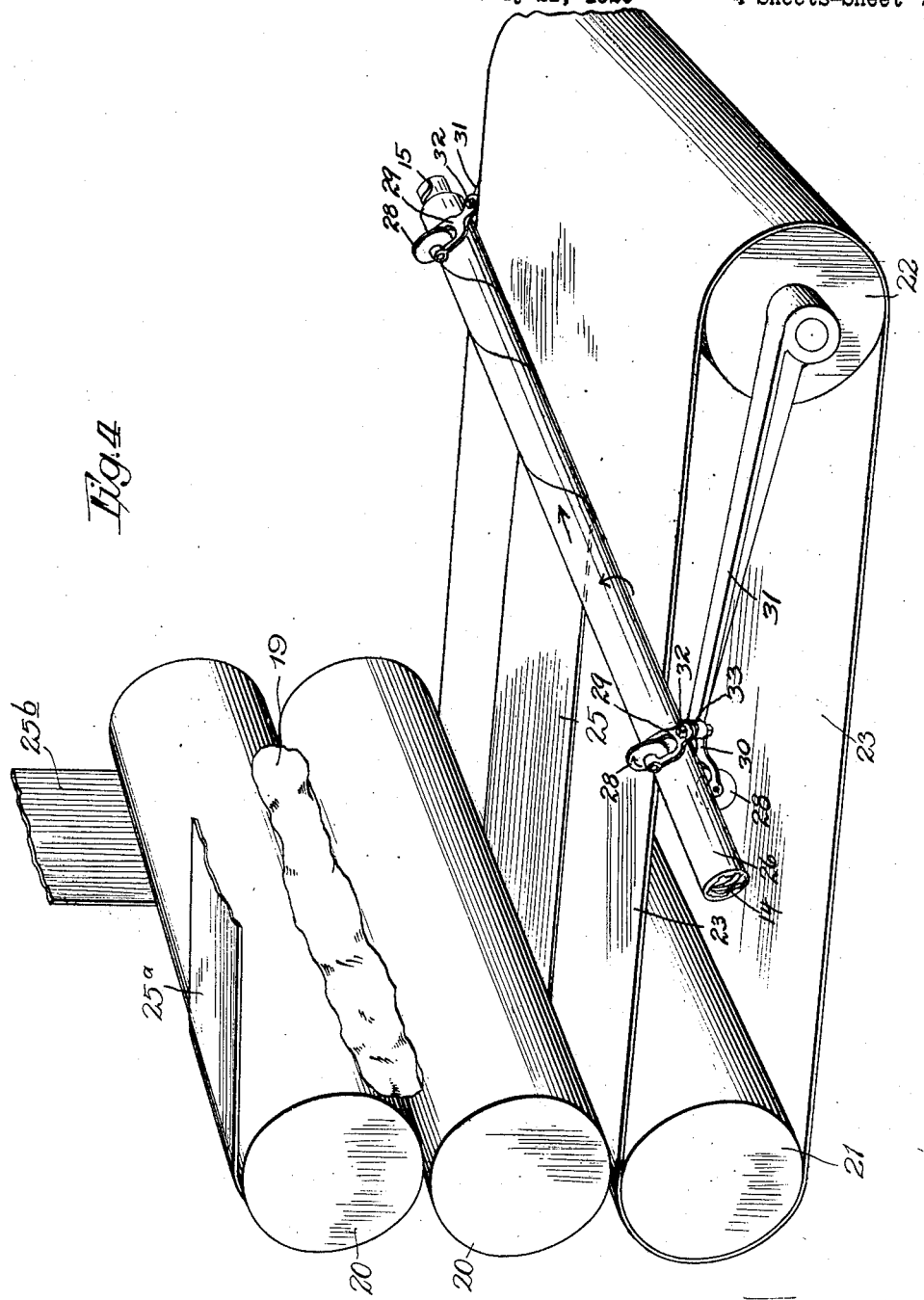

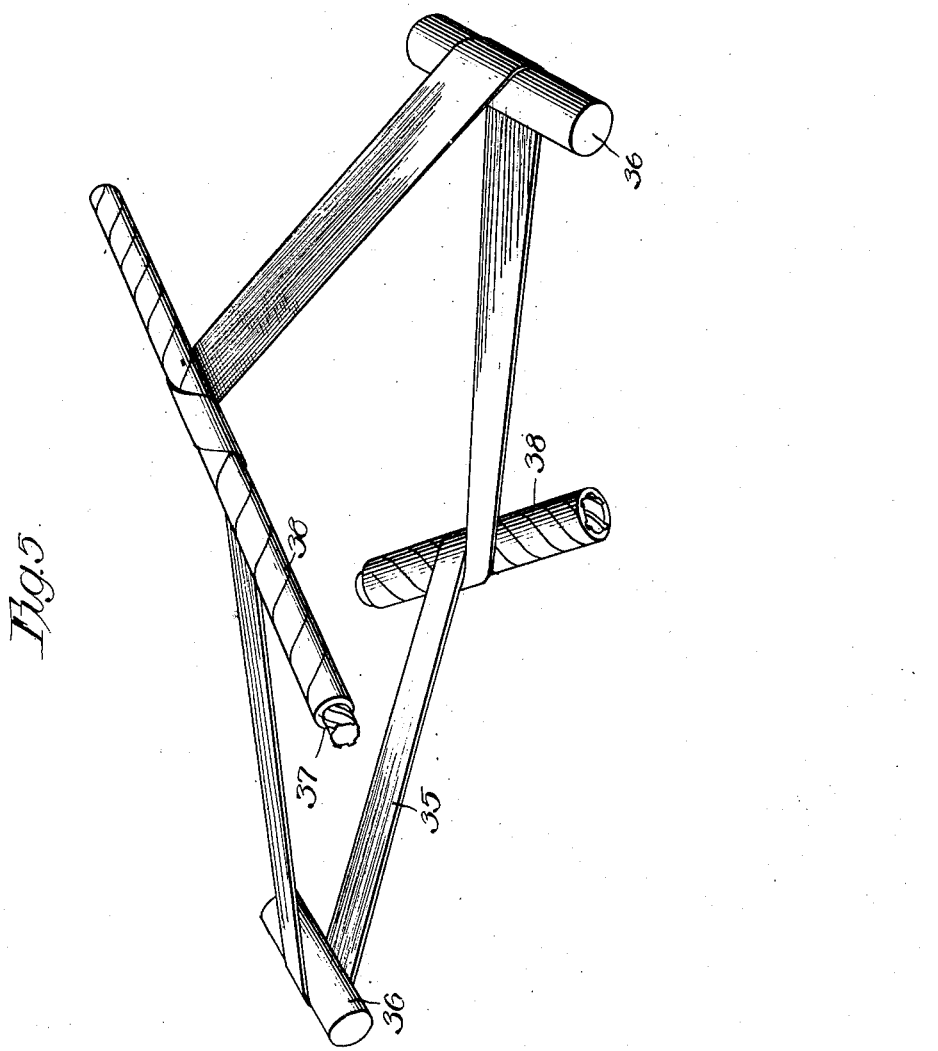

Aug. 25, 1925.
J. F. PALMER
1,551,264
METHOD OF MAKING INNER TUBES FOR PNEUMATIC TIRES
Filed July 21, 1920    4 Sheets-Sheet 4
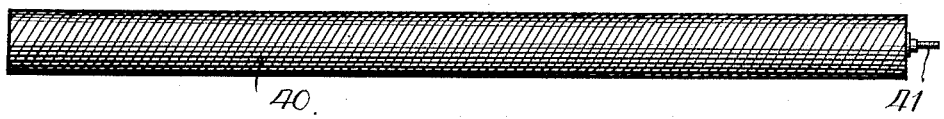
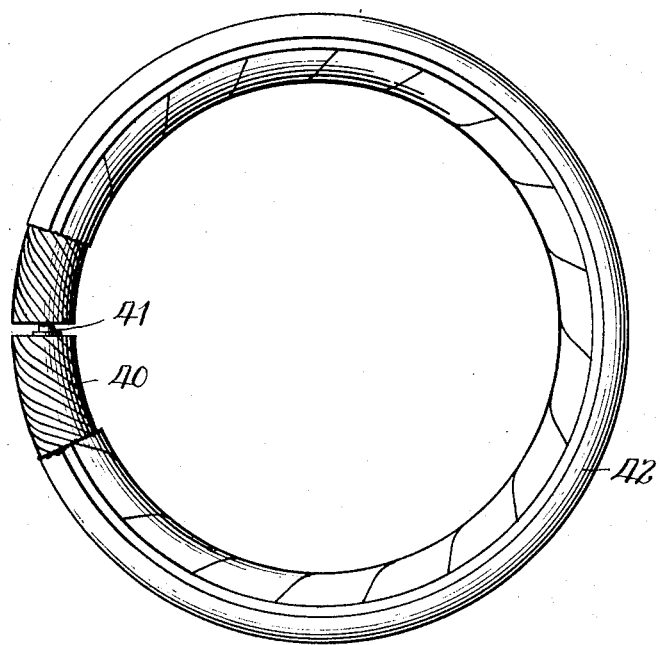
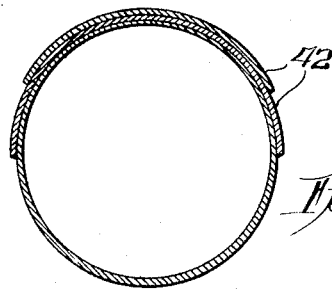

Patented Aug. 25, 1925.

1,551,264

UNITED STATES PATENT OFFICE.

JOHN F. PALMER, OF ST. JOSEPH, MICHIGAN.

METHOD OF MAKING INNER TUBES FOR PNEUMATIC TIRES.

Application filed July 21, 1920. Serial No. 397,852.

*To all whom it may concern:*

Be it known that I, JOHN F. PALMER, a citizen of the United States, residing at St. Joseph, in the county of Berrien and State of Michigan, have invented certain new and useful Improvements in Methods of Making Inner Tubes for Pneumatic Tires, of which the following is a specification.

This invention relates to improvements in methods for manufacturing inner tubes for tires.

In my copending application Serial No. 369,251 filed March 27, 1920, there is disclosed an improved method of manufacturing fluid pressure containing tubes according to which the sheets of rubber are wound spirally on the mandrel upon which the tube is formed. The present application is a continuation in part of said co-pending application and relates to an improvement upon the invention disclosed therein the principal object being to overcome the objectionable features which have been present in tubes heretofore known and in the methods of forming them.

On account of the excessive internal pressure within the inner tubes of pneumatic tires and also the severe external compression to which they are subjected by encountering obstructions in use, it is of the greatest importance that inner tubes should be as nearly perfect as possible in their air holding qualities. In order to obtain this, it is necessary that they should be uniformly capable throughout of withstanding the maximum interior pressure. It has been found impossible in practice to make inner tubes tubes having this essential characteristic by merely using a single thickness of sheet rubber because of the lack of uniformity in thickness and density throughout all portions of the sheet due to imperfections in the product of the mixing mills and calender rolls employed in making the sheets of rubber. It has therefore been the practice heretofore in manufacturing inner tubes to superimpose a number of thin sheets of rubber one upon the other in order that any imperfections in one ply may be corrected or sealed by the other ply or plies. This is ordinarily accomplished by rolling a thin sheet of rubber upon a mandrel of the desired diameter, the mandrel being given such a number of complete revolutions as may be necessary to make a tube of the desired number of plies or laminations, producing in effect a multiplicity of concentric tubes. This process of manufacturing is expensive in the appliances required, in labor cost and in the loss due to imperfect products. Furthermore, tubes made by this method are inferior in resistance to pressure radial of the tube and frequently split longitudinally thereof in coincidence with the fibrous arrangement of the rubber as it leaves the calender rolls and as it is rolled up in the laminations in the manufacture of the tube. A further objection to the methods of manufacturing heretofore followed is that after the tube is made, it is brought into forcible contact with the surface of the mandrel upon which it is built by means of a spiral wrapping of muslin or the like for the purpose of expelling the air from the region between the surface of the tube and the outer surface of the mandrel and in order to hold the rubber in forceful contact with the surface of the mandrel during vulcanization.

The principal object of the present invention is to overcome the necessity of wrapping the tube on the mandrel for the purpose of expelling the air by providing an improved method of manufacture whereby the application of the rubber itself to the mandrel effectively prevents the inclusion of any air between the mandrel and the rubber. Hence there is no need for expelling the air and when the tube is wound upon the mandrel the ends may be cut off and wrapped down with pieces of tape, as is customary, thereby preventing the entrance of air at either end of the tube. The tube may then be transferred at once to the vulcanizing chamber where under the pressure of the steam used, the rubber assumes the contour of the surface of the mandrel against which it is pressed. An important feature of the present invention is the provision of improved means for applying pressure on the rubber during the process of winding so that the air is positively expelled, or prevented from entering as the winding proceeds. A further important object of the invention is the provision of an improved method of manufacture whereby the mandrels are conveniently manipulated during the process of winding the rubber. Other objects relate to various features of the process and of the construction of the tube as will be pointed out more clearly hereinafter.

The nature of the invention will be more fully understood from a study of the following specification taken in conjunction with the accompanying drawings in which the tube is illustrated in a convenient and practical form and in which certain means of forming the same have been shown.

In the drawings—

Figure 1 is a perspective view showing the manner of winding a strip of sheet rubber upon a mandrel in order to form the improved tube of the present invention;

Fig. 2 is a view similar to Fig. 1 showing a second strip of sheet rubber being wound spirally on the outside of the convolutions formed by the winding of the first sheet upon the mandrel;

Fig. 3 shows a detailed plan view of a tube embodying the invention, a portion thereof being broken away to illustrate an inner layer of the rubber;

Fig. 4 shows a perspective view of a calender roll and other apparatus, illustrating one method of winding the rubber sheet upon the mandrel and maintaining a pressure thereon to expel the air;

Fig. 5 is a perspective view illustrating somewhat diagrammatically one method of treating the tubes after they have been wound on the mandrel in order to obtain additional compacting pressure upon the rubber and the mandrel before vulcanizing;

Fig. 6 illustrates a plan view of a flexible tube which may be employed to maintain the desired cross section of the tube while putting it into a curved or circular form;

Fig. 7 shows a side elevation of the improved rubber tube after it has been put into circular form and reinforced by outer layers of rubber; and Fig. 8 shows a cross section of the rubber tube after the outer layers of reinforcing rubber have been applied.

Referring to Fig. 1 of the drawings, the reference numeral 10 designates a cylindrical mandrel which may be of any desired length and which may be rotated in any desired manner. A strip of sheet rubber 11, formed by cutting a sheet of rubber longitudinally into the desired width as it issues from the calender rolls, is arranged with one end thereof bearing upon the mandrel 10 and the strip is then fed to the revolving mandrel at such an angle to the axis of rotation thereof that the strip is spirally wound upon the mandrel at the desired pitch. The pitch is determined according to the width of the strip and the number of plies which are desired in the finished tube. A sufficient tension is placed upon the strip during the process of winding to cause it to lie tightly upon the mandrel and upon the underlying portions of the preceding convolutions, or in the case of a thin sheet being used, some form of added pressure may be used for further compacting the laminations. This method of application is of particular advantage in preventing the inclusion of any air between the rubber and the surface of the mandrel.

As illustrated in Fig. 1, the width of the strip 11 and the angle at which it is fed to the mandrel have been so selected that the resulting tube will comprise three plies because of the fact that the width of the strip is three times the pitch of winding. Assuming that the strip 11 comprises three longitudinal portions of equal width 11$^a$, 11$^b$ and 11$^c$, the section 11$^a$ of each convolution will lie directly upon the central section 11$^b$ of the preceding convolution and will overlie the section 11$^c$ of the second preceding convolution. Each convolution therefore constitutes a part of each of the three concentric plies which form the tube.

The inherent elasticity of the rubber compensates for the difference in diamter of the several sections of each convolution, such difference in diameter resulting from the fact that one section 11$^a$ of the strip overlies superimposed sections of two preceding convolutions, whereas the second section 11$^b$ of each convolution overlies only one section of the immediately preceding convolution, and a third section 11$^c$ of each convolution rests directly upon the mandrel. The slight stretching of the rubber which results from these differences in diameter of the sections of the strip when wound in convolutions upon the mandrel results only in a negligible reduction in the thickness of the sheet and does not result in reducing the thickness of the wound tube, inasmuch as every portion of the tube comprises similar superimposed sections of three convolutions of the strip.

While a tube made of a single strip of sheet rubber or other material wound spirally in the manner described will possess sufficient strain resisting capacity for many purposes, greater strength and even greater resistance to distention may be secured by winding a second strip of material upon the tube previously formed by the spiral winding of a single strip. In Fig. 2 of the drawings there is illustrated a second strip of sheet rubber or similar material 12 which is wound spirally upon the tube formed on the mandrel by the winding thereon of the first strip 11. The second strip 12 is preferably fed to the revolving mandrel in such a direction that the convolutions are angularly disposed with relation to the convolutions of the first strip and preferably inclined in the opposite direction longitudinally of the mandrel. In Fig. 2, the longitudinal portions of the strip 12, which overlie the adjacent convolutions during the winding of the strip in order to effect the formation of three plies superimposed upon the three plies formed by the strip 11, are designated by the numbers 12$^a$, 12$^b$ and 12$^c$. The portion 12$^a$ of the strip directly overlies the portion 12$^b$ of the next preceding convolution of the strip 12 and the portion 12$^b$ overlies the portion 12$^c$ of the next preceding convolution, while the portion 12$^c$ lies directly upon the exterior of the tube which has previously been formed by the spiral winding of the strip 11.

The tubes formed by this process may be of any length but they are preferably made to conform to the ordinary practice of tubes for pneumatic tires. The mandrel should be made up in sections to correspond to the length of the tube necessary for a pneumatic tire and the ends of these mandrel sections are provided with screw threaded projections and recesses 14 and 15, respectively, which permit a number of mandrel sections to be semiautomatically connected or disconnected. Before any joint in the mandrel is broken or before the tube is severed into corresponding lengths, the rubber tube is taped down on either side of the mandrel joint to prevent the entrance of air at the open ends. Due to the use of a number of mandrel sections which have a screw threaded connection with each other, it is merely necessary to bring the end of a new mandrel section up to the end of the revolving mandrel on the belt when the two sections will be automatically and rigidly connected. When the mandrel section emerges from the belt after accumulating its laminations of rubber, it is merely necessary to grasp it or arrest its rotation in any way, whereupon the filled mandrel section will be automatically disconnected from the portion which is rotated on the belt. The twisting action of releasing the filled mandrel will automatically stretch the rubber tube and twist it together at the mandrel joint, whereby it is in a position to be severed with a pair of shears, making an air tight binding, after which further binding may be applied, if necessary, by means of tape or the like. After severing the tube and separating the mandrel sections with the ends of the rubber tube taped down, the section of the mandrel and the tube are transferred at once to the vulcanizing chamber where the pressure of the steam imparts to the rubber the contour of the mandrel against which it is pressed. The vulcanized tube is then removed, turned inside out, and in case the tube is to be used as the inner tube of a pneumatic tire, the ends thereof are brought together and united in any suitable manner to form a circular inner tube 16, as illustrated in Fig. 3, where the valve is designated by the numeral 17. An inner tube of increased strength and durability is thus obtained without the necessity of externally winding the tube with muslin or the like in order to expel the air.

The supply of gum designated by the numeral 19 is passed between the calender rolls 20 and formed into a rubber sheet of the desired thickness. A third roll 21 is mounted beneath and spaced slightly from the lower roll 20, and a fork or idler roll 22 is mounted parallel to the roll 21 and at some distance therefrom in substantially the same horizontal plane. A smooth belt 23 passes around the rolls 21 and 22 and these rolls as well as the calender rolls are driven by any suitable means adapted for the purpose. The rubber sheet formed by the calender rolls 20 may be divided into a number of strips 25, 25$^a$, and 25$^b$, and the central strip 25 is carried around the lower roll 20 and passed along on the belt 23. The other two strips 25$^a$ and 25$^b$ may be directed upwardly and carried to other duplicate units hereinafter described for forming the rubber tube. The mandrel 26 is laid across the belt 23 and over the rubber sheet 25 at an angle to the axes of the rolls 21 and 22 so that as the belt 23 advances the mandrel 26 is rotated and the rubber sheet is wound spirally thereon in the manner illustrated. The pitch of the spiral will depend upon the angle at which the mandrel is placed upon the belt and the weight of the mandrel will serve in itself to maintain sufficient pressure between the mandrel and the rubber to expel the air from the intervening space during the process of winding. The winding of the rubber on the mandrel by the movement of the belt automatically causes the mandrel to progress longitudinally in order to bring about the desired uniform spiral winding. In order to support the mandrel against lateral movement during its rotation and longitudinal translation, there are provided two pairs of rollers 28 of rubber or other suitable material which are mounted on the arms 29 and 30 of pivoted supporting members 31. The rollers of each pair have their axes inclined to the axis of the mandrel so that their peripheries contact with the mandrel at angles corresponding to the inclination of the spiral winding on the sides of the mandrel where the respective rollers are located. The rollers thus permit a spiral advance of the mandrel as the rubber is wound thereon. The pivotal mounting of the supporting arms 31 permits some oscillation of the rollers 28 to regulate the movements of the mandrel to the movements of the belt. The supporting arms may be replaced by others or means may be provided for adjusting the rollers thereon in order to accommodate their positions to spirals of different pitch and mandrels of different size. One method of providing an adjustment of the rollers is to mount the arms 29 and 30 on the supporting members 31 by means of clamping bolts 32 which permit the angular positions of the arms to be changed, and the spaced relation of the centers of the rollers 28 can be varied by inserting shims 33 beneath the arms 29 and 30. If desired, pressure may be applied through the rollers 28 or in any other desired way in order to supplement the weight of the mandrel in creating a pressure which will expel the air from the space between the mandrel and the rubber sheet and thoroughly compact the laminations.

As each mandrel section moves across the belt and is wound with rubber, another mandrel section is connected to the end thereof in such a way that it rotates as a continuation of the preceding mandrel section. After each mandrel section has passed across the belt and accumulated its laminations of rubber, the ends of the tube are bound down and the rubber is cut in a suitable manner at the desired place in order to separate it from the rubber on the following section. The tube is then vulcanized on the mandrel without further preliminary treatment.

The single sheet of gum rubber issuing from the calender rolls in Fig. 4 may be divided longitudinally, as indicated in Fig. 4, and each division carried in any suitable way to other levels and wound in a similar manner on independent belts and rolls. In this way the apparatus may be conveniently multiplied for simultaneously winding a number of mandrels with laminations of rubber received from the same calender. It will further be evident that the whole operation of forming the laminated tube may be carried on independently of the calender rolls and that the belt may encircle the tube spirally instead of being only in contact with it for a few degrees of its surface.

Whether the rubber be applied to the mandrel by a spiral winding or by some other means, it may be desirable to apply pressure to the rubber before performing the process of vulcanization. One means of applying this pressure conveniently is illustrated in Fig. 5 where an endless belt 35 is passed around two rotatable rollers 36 with the intervening portions of the belt arranged to engage spirally the mandrel 37 upon which rubber tubes 38 have been spirally wound. These mandrels 37 may be supported against lateral movement in any desired manner as, for example, by means of rollers, as illustrated in Fig. 4, and the spiral arrangement of the belt will automatically advance the mandrels and their tubes. The pressure of the belt on the rubber may be varied by any suitable tensioning device applied to the idler roll and further compacting pressure had to any extent desired for any number or thickness of laminations. A number of connected mandrel sections may be fed successively through the spiral loops of the belt without interfering with the continuous operation of the apparatus.

If a curved or circular tube is to be formed from the rubber tube obtained in the manner heretofore described, the tube is removed from the mandrel and there is drawn through it a flexible filler tube 40 of cord or fabric lined with rubber and having the warp and weft strands of the fabric or the opposing spirals of the cord laid at an angle to the axis thereof in order to permit the bending of the filler tube into an annulus, or a rigid flexible tube may be used and the rubber tube blown off in the ordinary way after manufacture; or a tube of wire made by winding opposed spirals one superimposed on the other, may be preferable under some circumstances. The filler tube is inflated through a valve 41 to a pressure which will maintain the desired cross section of the outer rubber tube when it is bent into circular form. The bending of the filler tube carrying the tube of raw rubber on its exterior surface operates to reduce the thickness of the rubber around the outer periphery of the circle and in order to replace this loss in thickness and to fix the tube in its curved condition, one or more layers of rubber 42 in sheet form are applied to the outer periphery of the rubber tube, as illustrated in Figs. 7 and 8, and after the filler tube has been deflated, these outer layers will oppose the return of the stretched outer portion of the tube to its original length. The ends of the rubber tube may then be joined after the filler tube has been withdrawn and a valve inserted to form a complete endless tube which may then be vulcanized in a mold. If desired, the tube may be vulcanized before joining the ends. In either case there is formed a curved or circular tube having an equal or predetermined thickness on its inner and outer periphery.

Although I have shown and described certain forms and adaptations of the invention for purposes of illustration, it will be understood that the improvements herein described may be carried out and utilized in various ways without departing from the scope of the appended claims.

I claim:

1. The process of manufacturing a fluid pressure containing tube which consists in passing a sheet of the tube forming material along a movable support, placing a mandrel on said sheet at an angle to the path of travel of said support, and supporting said mandrel against lateral movement while permitting rotation and longitudinal movement thereof.

2. The process of manufacturing a fluid pressure containing tube which consists in passing a sheet of the tube forming material along a movable support, placing a mandrel on said sheet at an angle to the path of travel of said support, supporting said mandrel against lateral movement while permitting rotation and longitudinal movement thereof to form a spirally wound tube on said mandrel, and vulcanizing the tube so formed on said mandrel.

3. The process of forming a fluid pressure containing tube which comprises the operations of causing a sheet of tube forming material to travel on a movable and flexible support, placing a mandrel on said sheet at an angle to the path of travel of said support, and confining said mandrel against lateral movement while permitting rotary and longitudinal movement thereof.

In testimony whereof, I have subscribed my name.

JOHN F. PALMER.